(12) United States Patent
Thomas

(10) Patent No.: US 10,055,262 B1
(45) Date of Patent: Aug. 21, 2018

(54) DISTRIBUTED LOAD BALANCING WITH IMPERFECT WORKLOAD INFORMATION

(71) Applicant: Amazon Technologies, Inc., Seattle, WA (US)

(72) Inventor: Christopher Carson Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 14/966,498

(22) Filed: Dec. 11, 2015

(51) Int. Cl.
*G06F 9/46* (2006.01)
*G06F 9/50* (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS

| | | | |
|---|---|---|---|
| 7,272,653 B2 | 9/2007 | Levy-Abegnoli et al. | |
| 7,389,510 B2 | 6/2008 | Forrester | |
| 8,914,598 B2 | 12/2014 | Gulati et al. | |
| 2014/0173131 A1* | 6/2014 | Newton | H04L 41/0893 709/240 |
| 2015/0227397 A1* | 8/2015 | Gogula | G06F 9/5094 718/104 |

FOREIGN PATENT DOCUMENTS

| | | |
|---|---|---|
| CN | 103368864 | 10/2013 |
| CN | 104331321 | 2/2015 |
| CN | 104850450 | 8/2015 |

OTHER PUBLICATIONS

U.S. Appl. No. 15/815,661, filed Nov. 16, 2017, Prashant Verma et al.
"Elastic Load Balancing Developer Guide", Amazon Web Services, May 18, 2009, pp. 1-142.
U.S. Appl. No. 13/864,162, filed Apr. 16, 2013, James Christopher Sorenson, et al.
U.S. Appl. No. 13/864,157, filed Apr. 16, 2013, James Christopher Sorenson, et al.
U.S. Appl. No. 13/864,152, filed Apr. 16, 2013, James Christopher Sorenson, et al.
U.S. Appl. No. 13/864,148, filed Apr. 16, 2013, James Christopher Sorenson, et al.
U.S. Appl. No. 13/864,145, filed Apr. 16, 2013, James Christopher Sorenson, et al.
U.S. Appl. No. 13/864,138, filed Apr. 16, 2013, James Christopher Sorenson, et al.
U.S. Appl. No. 13/864,167, filed Apr. 16, 2013, James Christopher Sorenson, et al.
U.S. Appl. No. 14/231,047, filed Mar. 31, 2014, Pradeep Vincent, et al.
U.S. Appl. No. 14/701,464, filed Apr. 30, 2015, Tarang Gupta.

* cited by examiner

*Primary Examiner* — Kenneth Tang
(74) *Attorney, Agent, or Firm* — Robert C. Kowert; Meyertons, Hood, Kivlin, Kowert & Goetzel, P.C.

(57) ABSTRACT

A load balancer obtains respective workload metrics of various worker nodes of a distributed system. In response to determining that a work request is to be assigned, the load balancer generates a workload variation estimate associated with the worker nodes. Using the workload variation estimate, the load balancer determines a size of a candidate pool of worker nodes for the work request. The load balancer assigns the work request to a selected worker node from the candidate pool.

21 Claims, 10 Drawing Sheets

DISTRIBUTED LOAD BALANCING WITH IMPERFECT WORKLOAD INFORMATION

BACKGROUND

Many modern computing applications are implemented in a distributed and layered fashion, with numerous worker nodes (often forming a back-end layer which is not directly accessible to application users for security and other reasons) responsible for executing the application's business logic. In many cases, the workload level of a distributed application may vary substantially over time, with new worker nodes being added or removed as needed based on various scaling policies of the application and/or the network-accessible services being employed by the application. Often, the workload may comprise units of work which can be performed largely independently of one another by individual worker nodes. In some cloud computing environments, hundreds or thousands of worker nodes may be configured for a given application.

For many such applications, front-end load balancers may be set up for receiving work requests and distributing the corresponding work units equitably among the back-end worker nodes. For very large applications, a group of load balancer may sometimes be employed, whose membership may also be adjusted from time to time based on the changing workload trends of the application. In such scenarios, at least some of the worker nodes to which a load balancer assigns work requests may also be the destinations of work requests sent by other load balancers. In order to make intelligent decisions regarding assignment of work units to worker nodes, e.g., so as to avoid overloading any particular worker node and to even out resource utilization levels as much as possible, a load balancer may use information about the current workload levels of the available worker nodes. However, especially in large dynamically-changing distributed environments in which network messages used to convey workload information can be delayed or lost, and in which worker nodes and other application components may leave or exit at random times, the workload information available to a given load balancer may often be incomplete or inexact.

Figure 1:
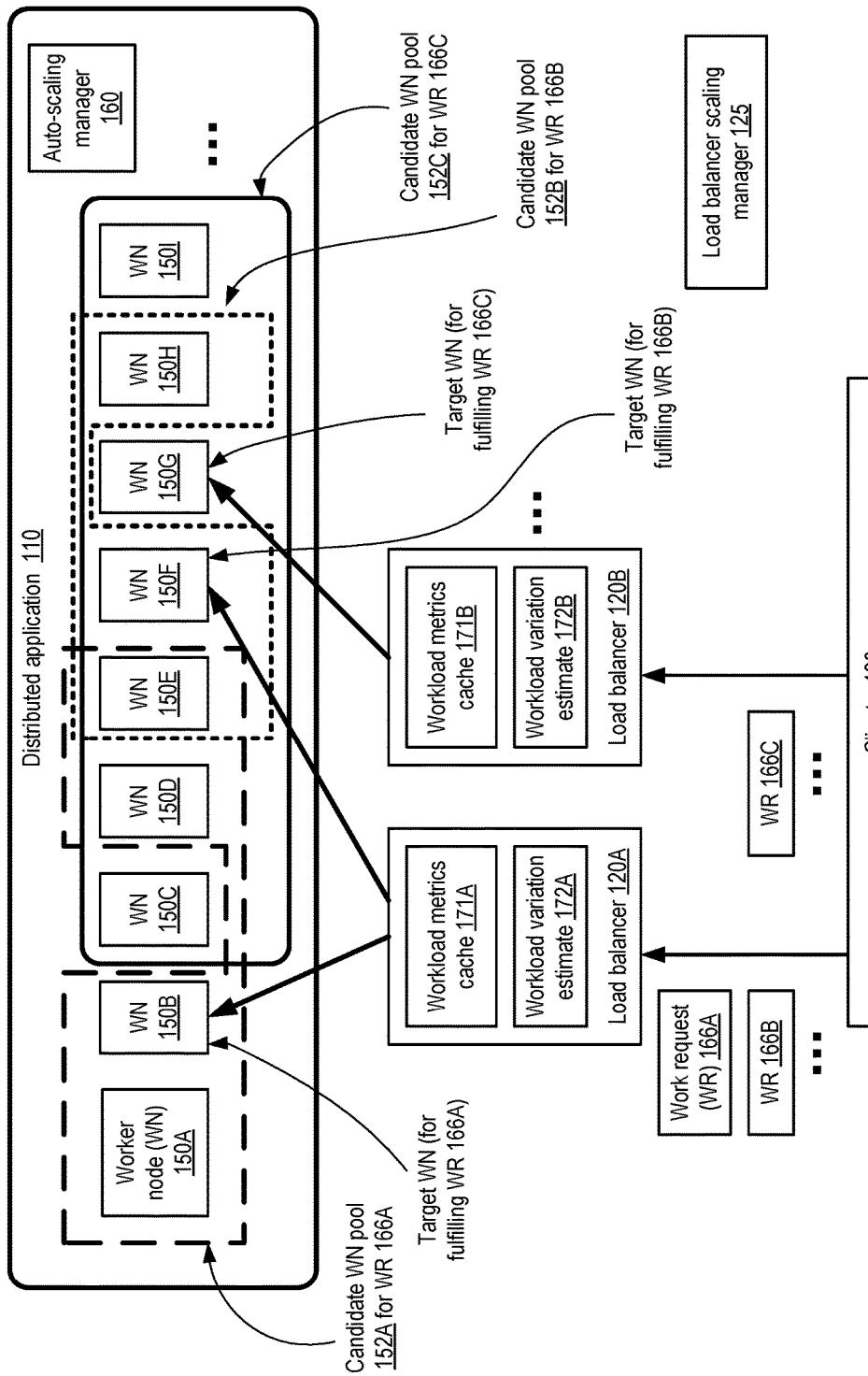
FIG. 1 illustrates an example system environment in which the sizes of respective candidate pools of worker nodes selected for various work requests of a distributed application may be selected based on workload variation estimates, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for making load balancing decisions for distributed applications using workload variation estimates derived from potentially imperfect or incomplete workload metrics are described. A given distributed application or service may comprise several different types of network-connected nodes in various embodiments. Each node may, for example, comprise one or more software and/or hardware components, such as some number of software processes or threads running at a computing host or other computing device. The terms "worker node" or "back-end" node may be used herein to refer the nodes at which the business logic of the application is executed, as opposed to front-end nodes which may be responsible for receiving work requests from application clients, distributing the work requests among back-end nodes according to desired load balancing goals, and in some cases forwarding responses generated at the back-end nodes to the application clients.

The techniques described herein may be utilized for numerous types of applications, at least some of which may be executed using resources of a provider network. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. The number of worker nodes available for a given application or service of a provider network may be quite large (e.g., hundreds or thousands of worker nodes may be set up). In at least one embodiment, an auto-scaling service may be employed to change the size of the worker node pool for a given application dynamically, e.g., as the overall workload increases or decreases. In some embodiments, a plurality of load balancer nodes may be set up for a given distributed application, and the size of the fleet of load balancers may also vary in size over time based on application workload. At some provider networks, a scalable load balancing service may be set up to accommodate large applications. In some such scenarios, the set of worker nodes and/or the set of load balancer nodes deployed may be scaled automatically as required, e.g., based on reaching workload thresholds, anticipated workload trends and the like, and without explicit requests from clients to add or remove worker nodes or load balancer nodes.

The nature of the individual work requests distributed by the load balancers may vary from one application to another. For example, some applications may implement web services interfaces, for which work requests may be submitted using some variant of HTTP (the HyperText Transfer Protocol) in various embodiments. In some cases, persistent connections may be established between a load balancer and some set of worker nodes, with web-services work requests and responses being transmitted using the persistent connections. In other cases, more transient connections may be established for at least some work requests and/or responses, and the connection for a given request may be discarded after the work is completed. In one embodiment, work requests may comprise relatively long-lasting batch jobs which may be handed over to the selected worker nodes for asynchronous processing. In some embodiments, the distributed application may comprise a relational or non-relational database, and the work requests may comprise database queries or transactions submitted using database-specific programmatic interfaces. In another embodiment, a work request may comprise a network routing request—e.g., the worker nodes may be assigned respective portions of a network address space associated with a distributed application, and routing decisions associated with client requests directed to addresses within a particular portion of the address space may be made using metadata stored at a given worker node.

Upon receiving an indication of a work request, in various embodiments a given load balancer of an application may utilize workload information regarding the worker nodes of the application to route the work request appropriately. A number of different sources of workload metrics may be employed in different embodiments, some of which may differ from others in the average quality or accuracy of the provided metrics. For example, in one embodiment, a load balancer may receive respective sets of workload information from the worker nodes to which that load balancer has directed work requests. Such workload information (e.g., some measure of the current number of outstanding or in-progress work requests at a given worker node, the response times of recent work requests, resource utilization levels, etc.) may be included or piggybacked in a work request response sent to the load balancer in some implementations. For various reasons, e.g., due to network delays or lost network packets, because the load balancer may not have distributed work to all the available worker nodes in a recent time interval or received timely responses from the worker nodes, or because worker nodes may have been added or removed from the application, the view of the worker node workload levels available to the load balancer may sometimes be incomplete or inaccurate. Other sources of workload information utilized in various embodiments may include, for example, analyzers of a database of batch job assignments, nodes of a health management service, or other load balancers. In some cases, the workload metrics available to the load balancers may be approximate—e.g., resource utilization levels averaged over some time interval may be provided, which may not necessarily reflect the current state of a worker node accurately, or the interval between successive reports of workload levels may be longer than the interval between successive work requests.

In various embodiments, at least some of the workload metrics sources and/or individual workload metrics obtained by the load balancer may not always meet a target set of quality criteria, and the load balancer may have to work with the best data available to it despite the inconsistency in the quality of the metrics. Examples of the quality criteria which may not necessarily be met may include timeliness criteria (e.g., that the set of metrics available for a given back-end node should be no more than T1 seconds old at the time that the set of metrics is used to make a load balancing decision), completeness criteria (e.g., that workload information about all the available worker nodes should be available at any given point in time), and accuracy criteria (e.g., the numerical quantities reported for CPU utilization should be accurate to within X %). In addition to the imperfections of the data obtained from any given metrics source, the load balancer may also typically have to make decisions based on combining metrics from several different sources, which may also add to the inexactness of the data. In at least some implementations, workload metrics collected from one or more sources may be placed in a local metrics cache at a given load balancer, and the current set of cached metrics (which in some cases may be incomplete for reasons such as those mentioned above) may be used when a load balancing decision is to be made for a given work request. In some embodiments in which a plurality of different workload metrics (e.g., the number of outstanding work requests, the response time, CPU utilization, etc.) are obtained, a normalized or aggregated multi-attribute measure of workload may be generated from the multiple metrics. In other embodiments, different weights or priorities may be assigned to the different kinds of workload metrics, which can then be used to break ties when comparing the workload levels of different worker nodes. For example, if the number of outstanding work requests is assigned the highest weight or priority, and the CPU utilization is assigned the next highest priority, the worker nodes may be ranked relative to each other based on the number of outstanding work requests, and the CPU utilization would be used to break ties among worker nodes (if needed) with the same number of outstanding work requests. In some embodiments, the load balancer may assign weights to different metrics sources (or individual metrics) based on an estimate of the accuracy of the metrics provided, and may use the weights when performing its computations—e.g., by making decisions based to a greater extent on high-quality metrics than on lower-quality metrics, while not ignoring lower-quality metrics.

According to one embodiment, a particular load balancer may collect worker node workload metrics from one or more metrics sources over some time period. In response to a particular work request, the load balancer may generate a workload variation estimate associated with the worker nodes, e.g., using the most recent set of workload metrics available at the load balancer. Any of a number of different workload variation estimates may be computed in different embodiments—for example, the range (the difference between the maximum and minimum workload levels among the worker nodes) may be computed in some embodiments, while the variance or standard deviation may be computed in other embodiments. A candidate pool of worker nodes for the work request may be selected, with the number of worker nodes included in the candidate pool based at least in part on the workload variation estimate. For example, in one embodiment, larger candidate pools may be selected for larger workload variation estimates, and smaller candidate pools may be selected for smaller workload variation estimates. By using workload variation estimates to dynamically select the candidate pool size, some of the problems associated with potentially inaccurate per-worker-node workload information may usually be overcome in various embodiments. For a large-scale application in which a given load balancer obtains workload information for dozens or hundreds of worker nodes, even if the individual workload information for a few of the nodes happens to be stale or missing, the workload variation estimate may typically be reasonably representative of the actual or "true" trends of the differences in workload among the worker nodes.

A number of different approaches with respect to selecting the specific members of the candidate pool may be taken in different embodiments—for example, in one embodiment, once the number of members of the pool has been identified, the members may be selected at random from the available worker nodes. In another embodiment, a member selection algorithm that is biased towards selecting lightly-loaded nodes may be employed—e.g., if the workload level of a given node is in the lower half of the known workload levels, the probability of including that node in the candidate pool may be increased by a factor of X % relative to uniform random selection, where X is a parameter of the load balancing algorithm.

After the candidate pool of worker nodes has been identified, one candidate may be selected as the target node to which the work request is to be assigned. In some embodiments, the candidate with the lowest workload level among the members of the candidate pool may be selected as the target. In other embodiments, an element of randomness may be introduced into the target selection—e.g., the least-loaded X % of the candidates may be identified, and one worker node from that least-loaded X % may be selected at random as the target. After the target has been selected, the work request may be directed to the target. In some cases, the load balancer may update its cache of workload information based on the assignment—e.g., if the load balancer is keeping track of the number of outstanding requests per worker node, the outstanding request count of the target node may be incremented. The load balancer may continue collecting workload metrics from its set of metrics sources, and select the target for the next work request it receives based on the best available metrics in a similar manner.

By selecting the candidate pool size based on the variation among potentially imperfectly-known workload levels, the load balancing algorithm outlined above may help to smooth workload levels among the worker node fleet in a more adaptable manner than, for example, if a fixed candidate pool size were used. The technique may be especially beneficial when new worker nodes are added to the application's fleet (e.g., by an auto-scaling service) during periods when the overall average worker node workload is high. Since the newly-added node's workload would typically be significantly lower than the older nodes initially, a larger candidate pool (which is more likely to include the new, lightly-loaded node) would tend to be selected during the early stages of the new node's lifecycle than if all the nodes had similar workload levels. As the new node's workload level caches up to the other nodes, the pool selected would be smaller, and the probability of directing new work to the new node would gradually decrease.

In one embodiment, a given decision made by a load balancer using workload variation estimates in a manner similar to that discussed above may apply to an entire category of work requests, and not just to an individual work request. For example, in one scenario a given distributed application App1 may receive work requests from N different clients. As such, the work requests of App1 may be grouped into N categories, with one category corresponding to each of the N clients. A load balancer may decide to assign all the requests of a given category (at least for some time period), such as all the work requests received from client K, to a particular worker node identified using the workload variation estimate-based approach. For example, in response to receiving the first work request from client K, the workload variation estimate may be updated at the load balancer based on the available metrics, and a candidate pool of worker nodes for client K's work requests may be selected based at least in part on the updated workload variation estimate. Then, from among the pool members, a particular worker node may be selected (e.g., the worker node with the lowest workload among pool members) for client K, and various work requests of the client K category (including the first request received from client K and some number of subsequent work requests from client K) may be forwarded to the selected worker node. Fulfilling different requests from the same client at a given worker node may, for example, be advantageous for some applications in which client-related metadata can be cached and re-used at the worker node for multiple work requests. In some implementations, a work category distribution request may be sent to a load balancer before any particular work request of the category has to be processed. For example, before any specific work requests of a given category Cat1 are transmitted to a load balancer, a work category distribution request for Cat1 may be sent to the load balancer, and the load balancer may select a particular worker node (or a group of worker nodes) for Cat1 using the workload variation estimate-based approach. In some embodiments, work requests may be categorized based on factors other than the requester's identity—for example, work requests may be categorized based on the specific kinds of operations requested, in addition to or instead of being categorized by client alone. In such embodiments, category-level selections of worker nodes based on workload variation estimates may be performed regardless of the factors used for work request categorization.

A number of variations on the basic algorithm outlined above may be employed in different embodiments. For example, in some embodiments, not all the worker nodes may have equivalent performance capabilities—e.g., due to the use of different CPUs or cores, different memory sizes, different networking connectivity approaches, and so on. In one such embodiment, the load balancer may normalize the workload metrics for different worker nodes based on their respective performance capacities, e.g., when determining the workload variation estimate, ranking the worker nodes, or selecting the least-loaded worker node as the target. In other embodiments, normalization techniques may be applied to work requests as well. For example, upon examining the parameters or attributes of a given work request, a load balancer may classify the work request as "light" or "heavy", and take the relative weights of various work requests into account when generating workload variation estimates etc.

Example System Environment

FIG. 1 illustrates an example system environment in which the sizes of respective candidate pools of worker nodes selected for various work requests of a distributed application may be selected based on workload variation estimates, according to at least some embodiments. As shown, system 100 includes a plurality of worker nodes 150 including worker nodes 150A-150I of a distributed application 110. A plurality of front-end load balancer nodes 120, including load balancer nodes 120A and 120B, have been configured to distribute work requests submitted by clients 180 among the worker nodes 150 in the depicted embodiment. An auto-scaling manager 160 configured for the distributed application 110 may dynamically add or remove worker nodes 150, e.g., based on detecting that threshold workload levels have been reached, anticipated trends in the application's workload over time, and so on. In some embodiments, new worker nodes 150 may be added (or removed) in response to explicit client requests, e.g., instead of or in addition to being added (or removed) automatically by the auto-scaling manager 160.

Each load balancer 120 maintains a respective workload metrics cache 171 (e.g., cache 171A at load balancer 120A, and cache 171B at load balancer 120B) in the depicted embodiment. A cache 171 may comprise a collection of raw and/or processed workload data collected from a variety of workload metrics sources, including for example the worker nodes 150 themselves, peer load balancer nodes, a health monitoring service associated with the distributed application, or analyzers of batch job assignment records. Examples of various types of workload metrics sources are discussed below in the context of FIGS. 7a, 7b, 8a and 8b. A number of different metrics may be stored for at least a subset of the worker nodes 150 in a given cache 171. The particular subset of worker nodes whose workload metrics are represented in a given cache such as 171A may differ from the subset of worker nodes whose metrics are represented in a different cache 171B in the depicted embodiment. Furthermore, in at least some embodiments, for a given worker node 150, the workload information available in one of the caches 171 may differ from the workload information available concurrently at another cache 171. At a given load balancer 120, the workload metrics may be collected asynchronously (and in some cases from a different collection of metrics sources) with respect to the workload metrics collected at a different load balancer. In general, due to any of a number of reasons, the information contained in a given cache 171 may be incomplete or inaccurate with respect to the actual state of the worker node fleet, at least at some points in time. Messages containing some of the network metrics may be delayed, for example, or lost before they reach the load balancers; thus, individual metrics or metrics sources may not meet quality criteria with respect to timeliness or completeness. In addition, some of the metrics may be intrinsically approximate rather than exact in various embodiments—e.g., samples of outstanding request counts, CPU utilization values or the like may be taken at various intervals in one implementation, and averages of the samples may be used as workload metrics.

Upon receiving a given work request such as 166A, 166B or 166C, a given load balancer 120 may use its metrics cache 171 to obtain a workload variation estimate 172 (e.g., estimate 172A at load balancer 120A, and estimate 172B at load balancer 120B) with respect to the set of worker nodes 150 among which the load balancer is configured to distribute the work requests. Different kinds of workload variation estimates may be generated in different embodiments. For example, given respective best-known approximations of workload at some set of individual worker nodes 150, in one embodiment a load balancer may simply identify the maximum workload Wmax and the minimum workload Wmin, and use the difference between Wmax and Wmin as its measure of workload variation. In another embodiment, the variance among the individual workloads, the standard deviation of the workloads, or some other statistical dispersion-related metric may be computed. In some embodiments, the load balancer may not necessarily have any workload information about one or more of the worker nodes when it receives a work request 166 and generates a corresponding workload variation estimate 172. For example, it may be the case that the auto-scaling manager 160 has recently added a new worker node for the distributed application, and load balancer 120A may not have collected any information about the newly-added worker node. In one embodiment, a default value (e.g., zero) for a workload level may be assigned to worker nodes for which no specific metrics have been obtained yet at a load balancer 120, and that default value may be used when generating the workload variation estimate 172.

A load balancer 120 may determine a size of a candidate pool of worker nodes for a received work request based at least in part on the workload variation estimate 172 in the depicted embodiment, and then populate the candidate pool by selecting individual worker nodes. For example, in the example illustrated in FIG. 1, a candidate pool size of four worker nodes is selected for work request 166A by load balancer 120A. The members of the candidate pool may be selected from the available worker nodes of which the load balancer is aware using any of several approaches in different embodiments. In some embodiments, the members may be selected randomly, e.g., using a pseudo-random number generator to generate random bit strings, and mapping the bit strings to individual worker nodes using a modulo function. In other embodiments, respective weights may be assigned to the worker nodes 150 for which the load balancer has workload information, e.g., based at least partly on the worker nodes' approximated workload levels, and candidates may be selected using the weights. In one implementation, weights proportional to the workloads may be assigned, and the candidates may be selected in such a way that the probability of selection increases as the weight (and approximate workload) decreases. Other approaches towards candidate selection may be used in other embodiments.

For the four-member candidate pool 152A generated in response to receiving work request 166A, worker nodes 150A, 150B, 150D and 150E have been selected (e.g., using random selection) from the available worker nodes 150A-150I. After the candidates are identified, an individual worker node (worker node 150B in the depicted example) from the candidate pool may be identified as the target to which work request 166A is assigned by load balancer 120A. In some embodiments, for example, the candidate with the lowest workload level may be selected as the target. In other embodiments, a different scheme may be used to select the target worker node 150 from among the candidates—e.g., random selection, workload-biased selection (in which candidates with lower workloads are chosen with higher probability than candidates with higher workloads), affinity-based selection (in which candidates which have been used for earlier work requests from the same client, or candidates which have earlier been selected for work requests which are similar to the current work request) may be used. In various embodiments, a given load balancer 120 may keep track of the work request assignments it has performed—for example, its assignment decisions may be used as one of the factors used to estimate the outstanding work requests at various worker nodes, and the per-worker-node assignments made by the load balancer may be included among the metrics stored in its cache 172. In at least one embodiment, the set of available worker nodes of which one load balancer 120A is aware may differ from the set of available worker nodes known to a different load balancer 120B at about the same time.

By the time load balancer 120A receives work request 166B, it may have obtained additional workload metrics. The updated workload variation estimate determined in response to work request 166B may lead to a different choice for the size of the candidate pool 152B—as shown, for example, three worker nodes may be included as candidates instead of the four worker nodes of pool 152A which were selected for work request 166A. The specific member nodes for pool 152B (nodes 150E, 150F and 150H) may then be selected, e.g., also using random selection, weighted selection or another technique similar to that use for identifying members of pool 152A, and a particular worker node (150F in the depicted example) may be assigned for fulfilling work request 166B.

Similarly, load balancer 120B may determine a candidate pool size of seven nodes for work request 166C based on its estimate of workload variation 172B. The worker nodes 150C-150I may be selected as members of candidate pool 152C corresponding to work request 166C, and worker node 150G may be assigned to work request 166C. In at least one embodiment, the set of (or even the types of) workload metrics sources used by one load balancer such as 120A may differ from the sources used by a different load balancer such as 120B. In at least one embodiment, the algorithm used for identifying candidate pool sizes may differ from one load balancer to another—e.g., load balancer 120A may use the workload range (Wmax–Wmin in the example discussed earlier) for its workload variation estimates 172A, while load balancer 120B may use the standard deviation of workload levels for its workload variation estimates 172B. In various embodiments, the load balancers 120 may operate independently of one another, with little or no exchange of information among them. In other embodiments, the load balancers may periodically or on demand share workload information that they have obtained, as discussed below in further detail in the context of FIG. 8b. In some embodiments, system 100 may also include a load balancer scaling manager 125, which instantiates additional load balancers 120 (or decommissions existing load balancers 120) based on trends or thresholds associated with the overall demand for application 110.

Workload Information Caches

Figure 2:
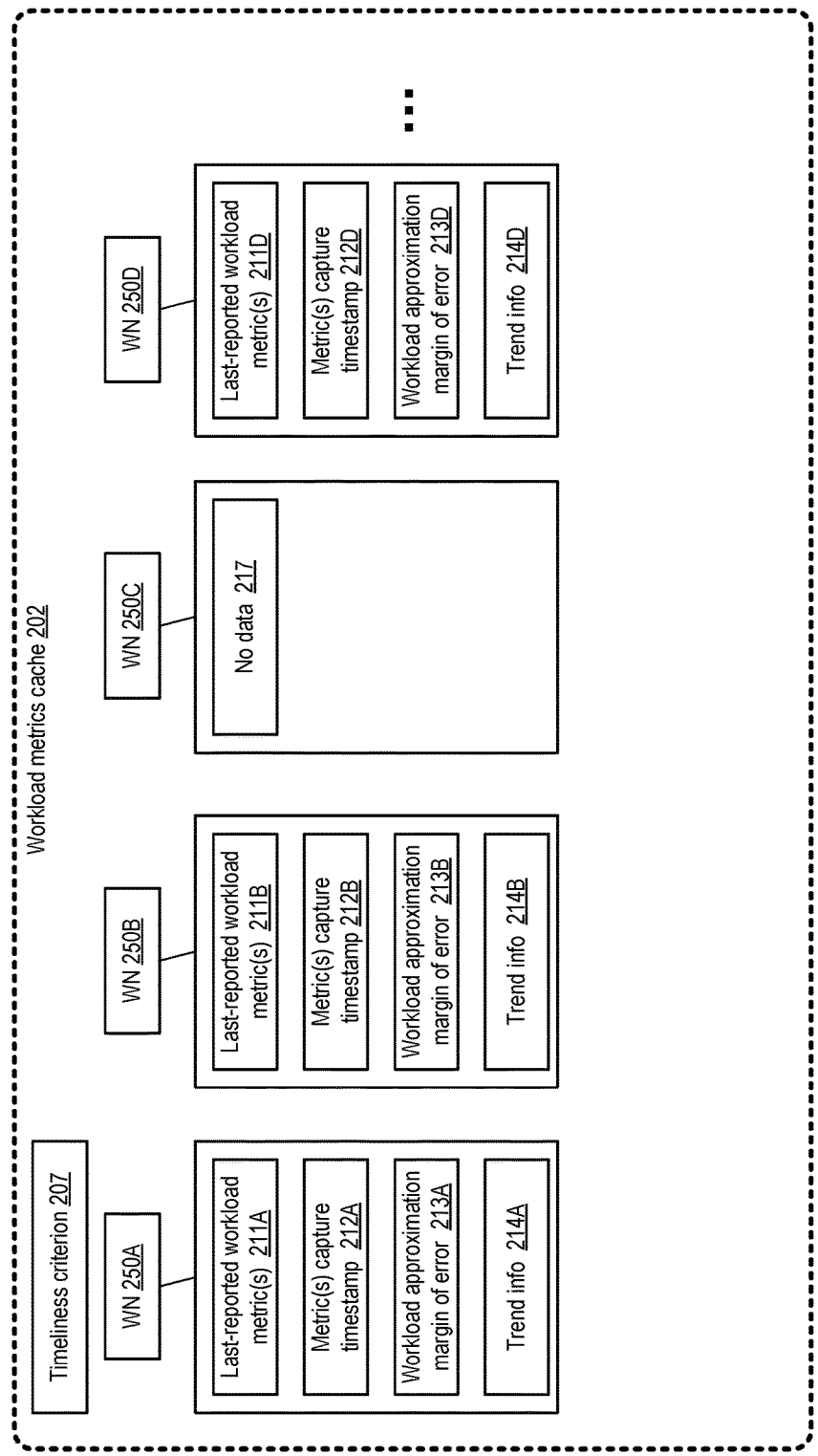
FIG. 2 illustrates example entries of a workload information cache which may be maintained at a load balancer of a distributed system, according to at least some embodiments.

FIG. 2 illustrates example entries of a workload information cache which may be maintained at a load balancer of a distributed system, according to at least some embodiments. Respective cache entries for four different worker nodes (WNs) are shown in cache 202 of a particular load balancer: WN 150A, WN 150B, WN 150C and WN 150D. For worker node 150C, no workload data has been placed yet in the cache, as indicated by the "no data" entry 217. With respect to each of the other three worker nodes, a set of last-reported workload metrics 211 (e.g., 211A, 211B or 211D) is stored in the cache 202. In addition, a respective timestamp 212 (e.g., 212B, 212C or 212D) indicating when the most recent metrics were captured may be stored in the cache in some embodiments. At a given point in time, for example, some of the most-recently-collected metrics may not meet a timeliness criterion 207—e.g., metrics which were collected more than T seconds before they are used at a load balancer may be deemed stale or untimely, while metrics which are collected within T seconds or less of use may be deemed up-to-date. In various embodiments, because of the potential for temporary network delays and the possibility of lost packets, a given load balancer may have to operate using the best available mix of stale and non-stale (up-to-date) metrics. For example, in one implementation, the workload variation estimate generated by the load balancer may be based at least in part on one or more workload metrics which do not meet timeliness criteria, as well as on one or more up-to-date workload metrics.

In some embodiments, especially in scenarios in which multiple types of workload metrics are combined to form an aggregate or composite multi-factor or multi-attribute metric as described below, a load balancer may generate respective margins of error 213 (e.g., 213A, 213B or 213D) for their workload approximations. The margins of error may be based on various factors such as how recently the metrics were collected, the expected correlations between the individual metrics and the aggregated metrics, and so on. The margins of error may also be used to compute the workload variation estimates, to identify members of the candidate pools of worker nodes, and/or to select the target worker node to which a given work request should be assigned. In some embodiments, the load balancer may include some information on workload trends 214 (e.g., trends 214A, 214B or 214D) for various worker nodes, which captures some longer-term temporal changes observed in the nodes' workload levels. Using trend information (e.g., whether the number of outstanding work requests at a given node has been steadily increasing, fluctuating up and down, or steadily decreasing when snapshots taken at T-second intervals over the last X minutes are examined) may also help in selecting targets for respective work requests in some embodiments. For example, if the target selection algorithm has resulted in selection of WN 150D, but the trend information shows that that WN 150D's workload has been increasing steadily, a different worker node be identified as the target in some embodiments. Additional data entries, not shown in FIG. 2, may be stored in the caches at various load balancers in some embodiments, and some of the entries shown in FIG. 2 may not be included in the caches. In some embodiments, one or more remote repositories of workload information may be consulted or accessed by one or more load balancers, e.g., instead of or in addition to using local caches 202 of the kind shown in FIG. 2.

Workload Variation Estimates

Figure 3:
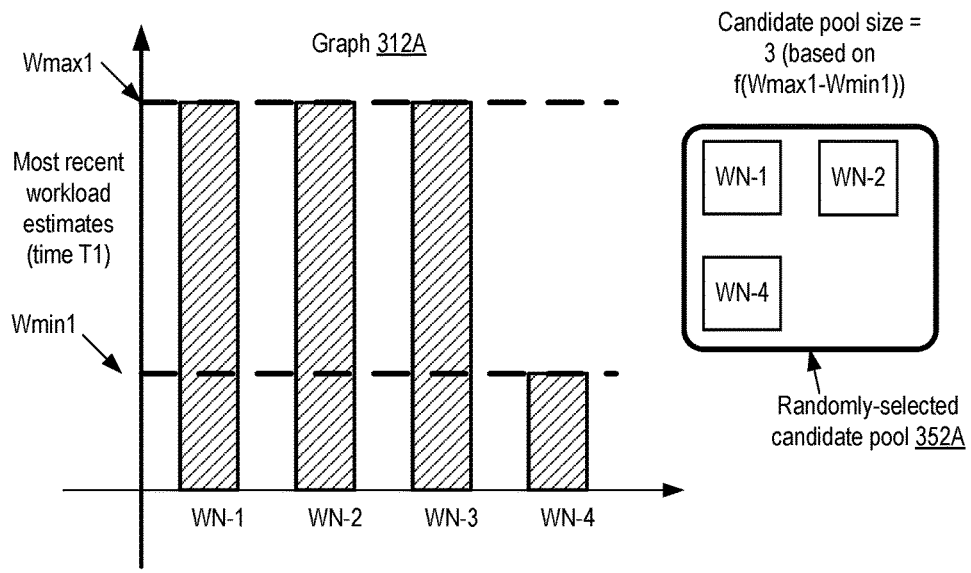
FIG. 3 illustrates an example scenario in which the number of worker nodes selected for a candidate pool is based on the difference between the maximum and minimum workload levels of available worker nodes, according to at least some embodiments.
Figure 3:
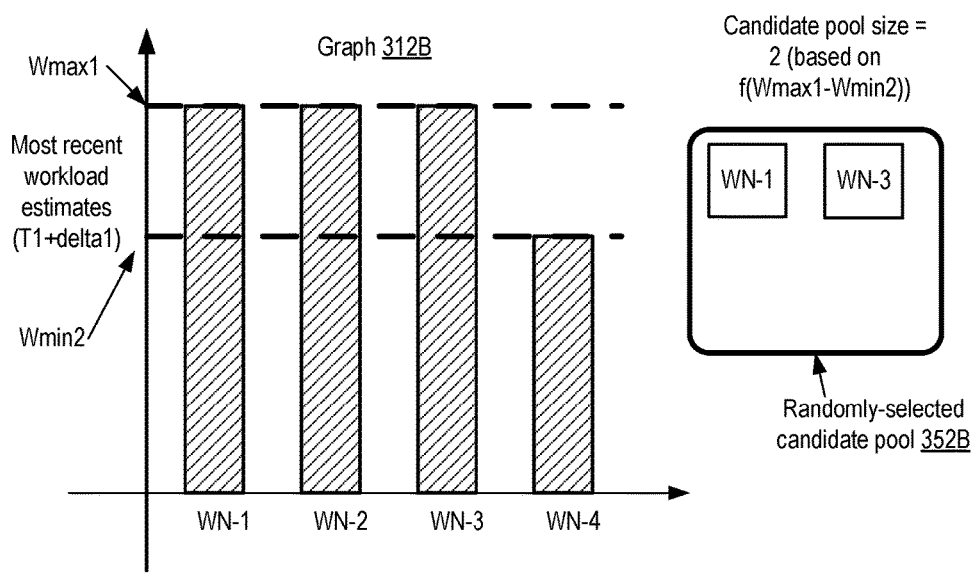

FIG. 3 illustrates an example scenario in which the number of worker nodes selected for a candidate pool is based on the difference between the maximum and minimum workload levels of available worker nodes, according to at least some embodiments. In the depicted embodiment, a given load balancer configured for a distributed application assigns work requests using the most recent set of workload information for four worker nodes WN-1 through WN-4 of the application. Graph 312A indicates estimated workload levels for the four worker nodes available at the load balancer at a given point in time T1, while graph 312B shows the estimated workload levels for the same four worker nodes available at the load balancer at a later time (T1+delta1). With respect to a work request received at or shortly after T1, the load balancer determines that the maximum workload level among the four worker nodes is Wmax1 (at nodes WN-1, WN-2 and WN-3), and the minimum workload level is Wmin1 (at node WN-4) as shown in graph 312A. The load balancer then determines, using a function f(Wmax1−Wmin1), that the size of the candidate pool of worker nodes to be identified for that work request is three. Any of a variety of linear or non-linear functions may be used in various embodiments. Consider an example scenario in which there are N active worker nodes available and the current estimated load of each active worker node I is L[i], where the values of L[i] can range from 0.0 (no load) to 1.0 (maximum load). The following function may be used to select the size of the candidate pool:

poolsize=min(N,max(3,ceiling(N*0.7*(max(L)−min(L)))))

That is, out of N possible candidates, a candidate pool size of a minimum of 3 nodes (assuming N is greater than 3) and 70% of N nodes may be used. In this example, a candidate pool size of 3 nodes would tend to be selected when there is very little difference between maximum and minimum per-node workload estimates, and a candidate pool size of 70% of the available worker nodes would be selected when the difference is as large as the maximum achievable workload of a given node.

In FIG. 3, after the size of pool 352A is determined, three worker nodes WN-1, WN-2 and WN-4 are selected as members of candidate pool 352A, e.g., using random selection from among the available nodes. After the candidates have been identified, one among them (e.g., WN-4, based on its lower workload relative to WN-1 and WN-2) may be selected as the target to which the work request should be assigned. The particular target worker node to which the work request is assigned may be selected, e.g., by ranking the candidates in workload level order and choosing the one with the lowest workload level. In the scenario corresponding to graph 312A, one of the four worker nodes (WN-4) has a substantially lower estimated workload level than the other three. Such a skewed distribution of workloads may sometimes arise when a new worker node (e.g., WN-4) has recently been added for the application by an auto-scaling manager, for example. By increasing the candidate pool size based on the difference (Wmax1−Wmin1), the probability that the least-loaded worker node (WN-4) is selected as a candidate may be increased even in scenarios in which candidates are selected at random.

In graph 312B, the workload level of WN-4 as of time (T1+delta1) has increased relative to its workload level as of time T1, e.g., as a result of the assignment to WN-4 of the work request which led to the selection of pool 352A. Now, the minimum estimated workload level among the four worker nodes is Wmin2 (which is higher than Wmin1), while the maximum workload level is still Wmax1. Based on the function f(Wmax1−Wmin2), the size determined for the candidate pool for a new work request received at or shortly after (T1+delta1) is two. Worker nodes WN-1 and WN-3 are selected at random as members of candidate pool 352B in the depicted example. Because the candidate pool size is smaller in the scenario of graph 312B than in the scenario of graph 312A, the probability of selecting the least-loaded node WN-4 is smaller in the latter scenario. As a result, it may not always be the case that the worker node with the lowest estimated current workload level is necessarily selected as the target node for assigning a new work request—for example, either WN-1 or WN-3 would be assigned the new work request in the scenario corresponding to graph 312B, even though WN-4's current estimated workload appear to be lower than that of either WN-1 or WN-3. This approach, of not necessarily selecting the least-loaded node as the target while increasing the probability that such a node is considered as a candidate based on the extent of workload variation, may help avoid scenarios in which a given least-loaded worker node is assigned so much work that it becomes overloaded. For example, if a burst of new work requests are received more quickly than the load balancers' workload metrics cache is updated, and an element of randomness is not added to the pool selection procedure as described above, the same worker node (e.g., WL-4) may end up being selected as the target for the entire burst, which could result in that worker node becoming a bottleneck.

Figure 4:
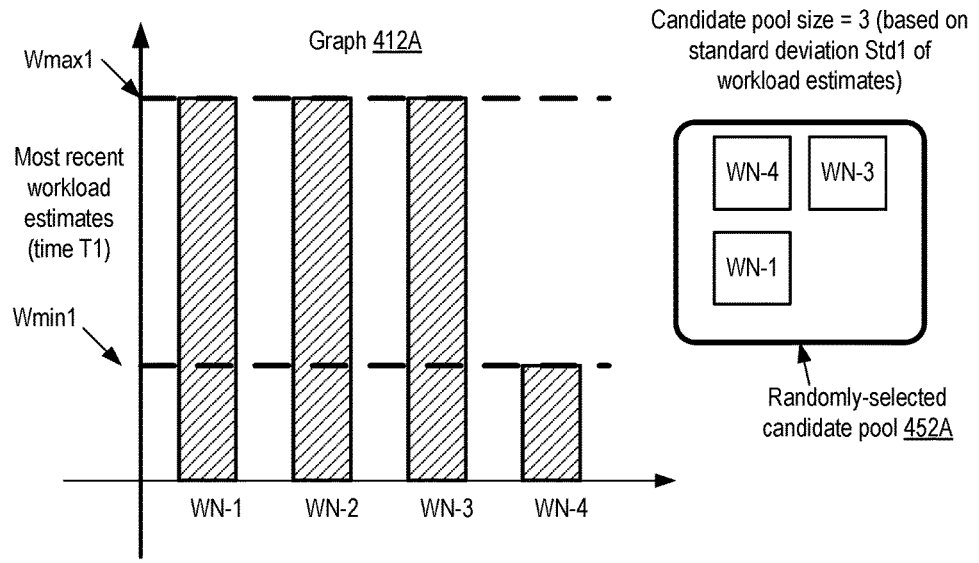
FIG. 4 illustrates an example scenario in which the number of worker nodes selected for a candidate pool is based on the variance or standard deviation in workload levels among worker nodes, according to at least some embodiments.
Figure 4:
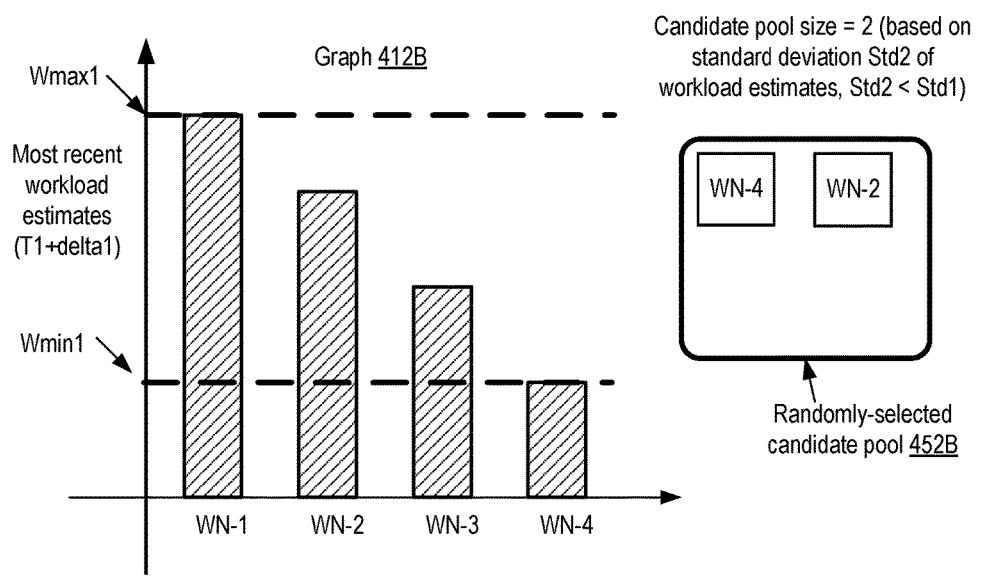

FIG. 4 illustrates an example scenario in which the number of worker nodes selected for a candidate pool is based on the variance or standard deviation in workload levels among worker nodes, according to at least some embodiments. In the two graphs 412A and 412B of FIG. 4, the difference between the maximum and minimum workloads (Wmax1 and Wmin1) is the same, but the dispersion of the workloads (e.g., the extent to which individual workload level estimates differ from the mean workload estimate) change. In graph 412A, several of the workload levels (those of WN-1, WN-2 and WN-3) are very similar to each other; in contrast, the workload levels of the individual worker nodes are somewhat more widely spread out in graph 412B. In the depicted example, the value of a dispersal metric such as the variance or the standard deviation of the workload levels is assumed to be higher in graph 412A than in graph 412B. The sizes of the candidate pools 452A and 452B are chosen based on (e.g., proportional to) the dispersal metrics, and as a result the candidate pool 452B (with two members) is smaller than the candidate pool 452A (with three members). After candidate pool sizes have been determined, the members of candidate pools 452A (WN-4, WN-3 and WN-1) and 452B (WN-4 and WN-2) may be selected using random selection in the depicted embodiment. The particular target worker node to which a given work request is assigned may then be selected from the candidate pool, e.g., by ranking the candidates in workload level order and choosing the one with the lowest workload level in a manner similar to that discussed in the context of FIG. 3. As a result of using dispersal statistics such as standard deviations or variances to choose candidate pool sizes, at least in some cases the workload levels at different worker nodes may tend to converge more quickly than if just the minimum and maximum workload levels were considered when determining candidate pool sizes.

Techniques for Ranking Worker Nodes

As indicated above, at least some of the decisions made by a load balancer (e.g., the selection of a target worker node from members of a candidate pool) may involve arranging a set of worker nodes in order of estimated workload levels.

Figure 5:
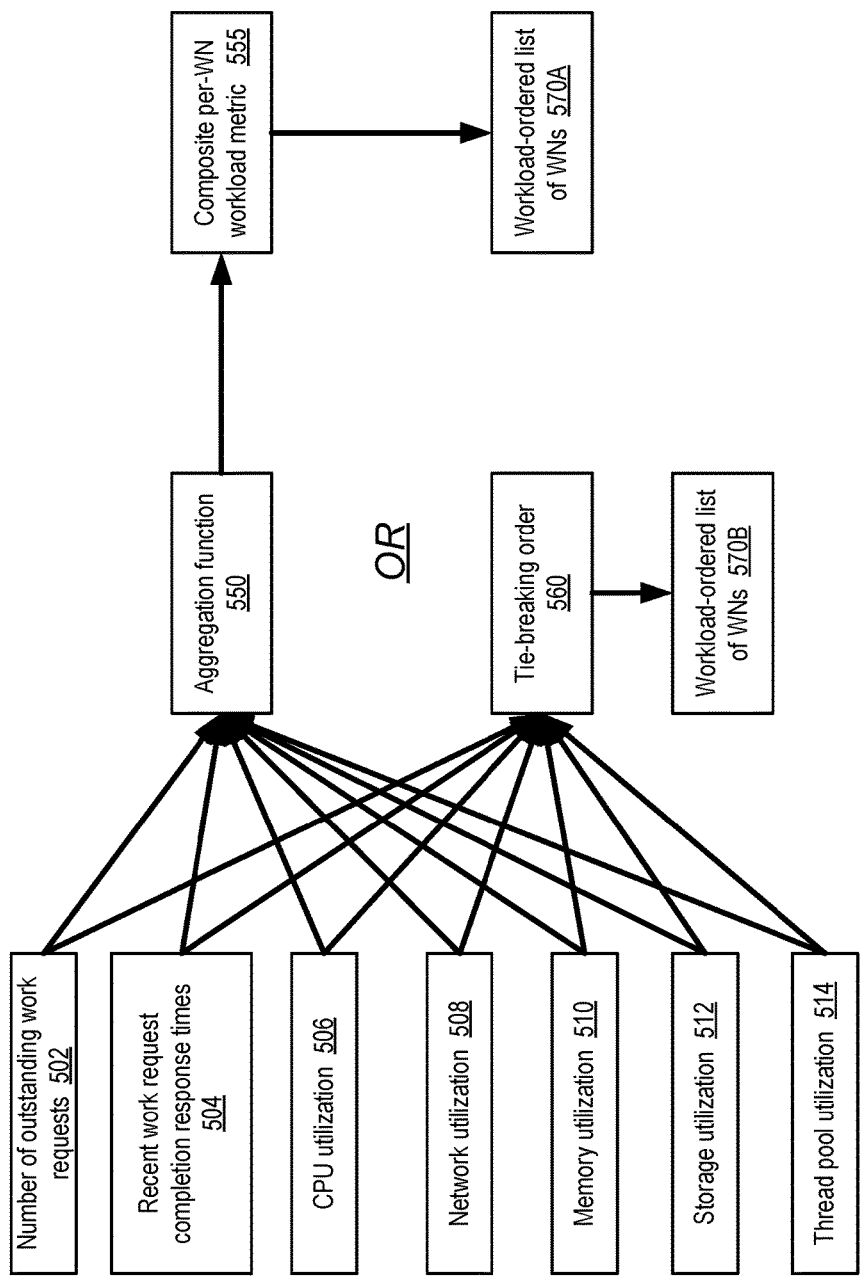
FIG. 5 illustrates examples of factors that may be taken into account to generate a workload-ordered list of worker nodes, according to at least some embodiments.

In at least some embodiments, multiple workload metrics may be used in combination to generate such rankings of worker nodes. FIG. 5 illustrates examples of factors that may be taken into account to generate a workload-ordered list of worker nodes, according to at least some embodiments.

A variety of workload metrics (some of which may be obtained from different metrics sources than others, and some of which may have different accuracy or timeliness characteristics than others) may be collected for a given worker node in the depicted embodiment and used to rank the worker nodes. Such metrics may include the number of outstanding work requests 502, some measure of recent work request completion times 504 at the worker node, CPU utilization 506 of the worker node, network utilization 508, memory utilization 510, storage device utilization 512, thread pool utilization 514, and so on. A number of other data structure-related metrics (such as the number of sockets in use, the number of Transmission Control Protocol or User Datagram Protocol ports in use, application-specific data structures such as buffer pool pages in use, and the like) may also or instead be used in some embodiments as indicators of the workload levels at the individual worker nodes.

Generally speaking, one or both of two approaches indicated in FIG. 5 may be used in various embodiments to rank worker nodes when multiple workload metrics are available for each worker node. In one approach, a composite workload metric 555 may be generated for each worker node by combining the individual metrics available for that node using a selected aggregation function 550. For example, each workload metric may be expressed as a numeric value between 0 and 100, and the arithmetic mean, harmonic mean or geometric mean of the different metrics may then be computed and used as the composite workload metric. A workload-ordered list 570A of the nodes may then be generated using the composite metric values.

In a second approach, instead of generating a single composite metric, a tie-breaking order 560 may be determined for the different metrics, with a given metric being used to determine a node's ranking in a workload-ordered list 570B only if the metrics higher in the order are tied. For example, consider a scenario in which the number of outstanding work requests 502 is designated as the workload metric at the highest position in the tie-breaking order, a CPU utilization metric 506 is designated the second-highest in the tie-breaking order, and a memory utilization metric 510 is designated as the third-highest metric. In this scenario, when determining the relative ranking of two worker nodes WN-1 and WN-2 in list 570B, the number of outstanding work requests of each node would be compared first. CPU utilization metrics of the two nodes would be compared only in the number of outstanding requests were identical for the two nodes, and similarly, the memory utilization metrics would be compared only if both the outstanding work requests and the CPU utilization metrics were tied for the two nodes.

Worker Node Capacity-Based Normalization

Figure 6:
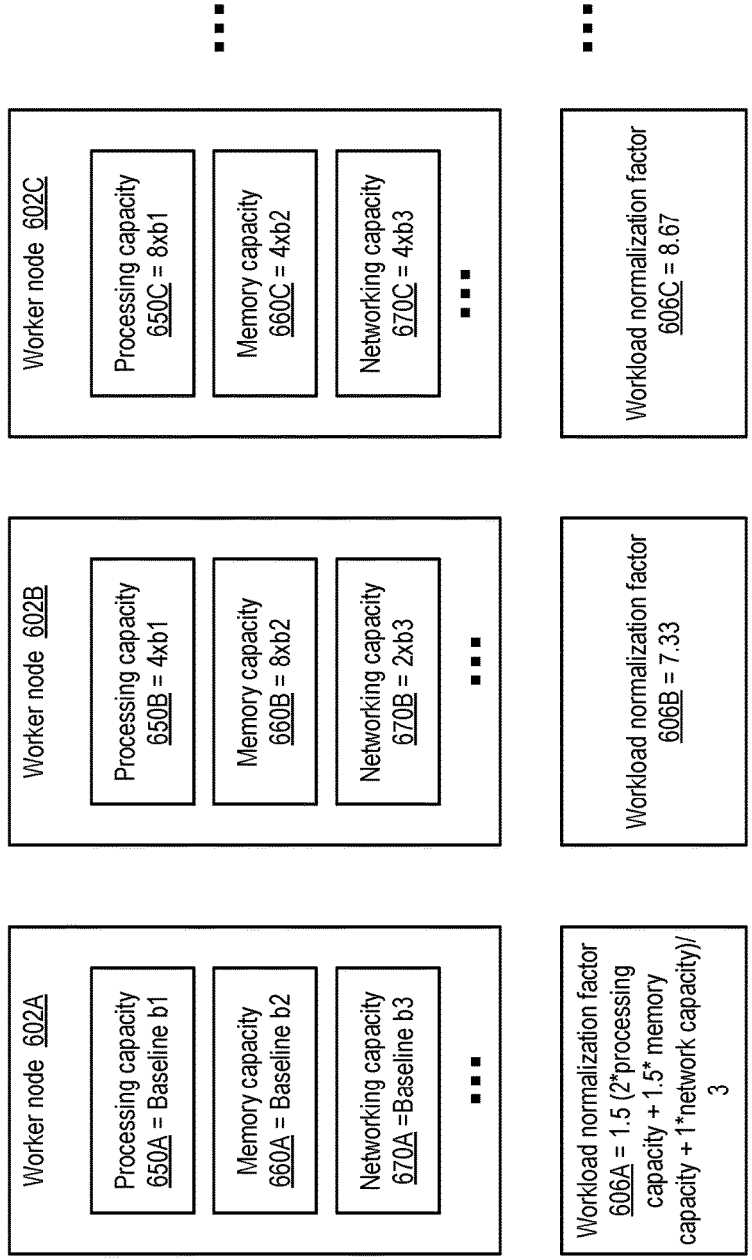
FIG. 6 illustrates an example scenario in which different normalization factors may have to be associated with worker nodes based on the differences in the worker nodes' performance capacities, according to at least some embodiments.

In some embodiments, worker nodes used for a given application may differ from one another in their hardware and/or software, and as a result their respective performance capabilities may differ as well. In such scenarios, the differences among the nodes may have to be taken into account when ranking the nodes. FIG. 6 illustrates an example scenario in which different normalization factors may have to be associated with worker nodes based on the differences in the worker nodes' performance capacities, according to at least some embodiments. As shown, worker nodes 602A, 602B and 602C differ in their relative processing capacity, memory capacity and network capacity. Worker node 602A has a baseline level b1 of processing capacity 650A (e.g., as a result of the number and type of CPUs or cores available at node 602A), worker node 602B's processing capacity 650B is four times greater than the processing capacity of worker node 602A, and worker node 602C's processing capacity 650C is twice the processing capacity of worker node 602B. The ratio of the relative memory capacities 660A, 660B and 660C of the worker nodes 602A, 602B and 602C is 1:8:4, while the ratio of the relative networking capacities 670A, 670B and 670C is 1:2:4. The baseline levels of the different types of performance capacities may be expressed in different units: for example, the baseline processing capacity b1 may be expressed in operations per second of a processing benchmark, the baseline memory capacity b2 may be expressed in gigabytes of memory available, and the baseline networking capacity b3 may be expressed in megabits per second of outbound and inbound network traffic. The load balancers may obtain the relative capacities of different worker nodes from an inventory manager of the provider network at which the distributed application or service comprising the worker nodes is run in various embodiments.

In order to determine the relative workload levels of the worker nodes 602, respective normalization factors 606A, 606B and 606C may be computed in the depicted embodiment. Different weights may be assigned to the processing capacity, the memory capacity and the network capacity when calculating the normalization factors. For example, in the depicted embodiment, processing capacity is assigned twice the weight as networking capacity, and memory capacity is assigned 1.5 times the weight as networking capacity. When combining the different types of resource capacities into a single normalization factor, the differences in the capacity units used for the resources may be ignored (e.g., the fact that CPU capacity is expressed in different units than memory capacity may be ignored—instead, only the coefficients relative to the baselines may be used). Configurable application-specific parameters may be used to assign the weights in some embodiments—e.g., an administrator of the distributed application employing the worker nodes may choose the weights, or a control-plane component of the provider network may choose the weights. When comparing the relative workloads of two worker nodes such as 602A and 602B, the raw estimated workload levels of the nodes may be divided by the normalization factors in some implementations. For example, consider a scenario in which the number of outstanding work requests is used as the primary workload metric, and both node 602A and node 602B each have 100 outstanding work requests. The normalized workload for node 602A in this example would be (100/1.5)= 66.67, while the normalized workload for node 602B would be (100/7.33)=13.64, so node 602B would be deemed to have a lower workload level than node 602A. Other kinds of performance capacity information (e.g., disk speeds or disk sizes), not shown in FIG. 6, may also or instead be obtained in some embodiments and used for normalization in an analogous manner.

Example Workload Metrics Sources

Figure 7A:
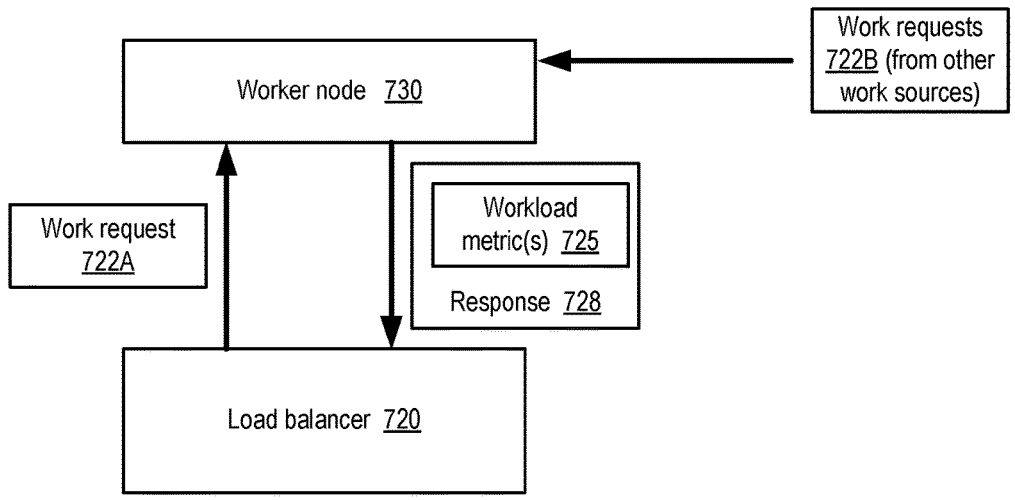
FIGS. 7a, 7b, 8a and 8b collectively illustrate a variety of workload metrics sources which may be used for load balancing decisions, according to at least some embodiments.

FIGS. 7a, 7b, 8a and 8b collectively illustrate a variety of workload metrics sources which may be used for load balancing decisions, according to at least some embodiments. In FIG. 7a, a load balancer 720 may receive one or more workload metrics 725 in a response 728 from a given worker node 730 to a work request 722A. In some embodiments, the work requests and their responses may be transmitted via persistent network connections established between the load balancer 720 and the worker node 730, e.g., for a web-services-based distributed application. The worker node 730 may receive additional work requests 722B from other sources, about which the load balancer 720 may not be aware. As a result, the load balancer 720's own work request assignment history may not be sufficient to provide a complete view of the workload being handled by the worker node. Since the workload metrics 725 may be included within response messages which are required for work requests according to the programmatic interfaces (e.g., web-services interfaces) of the distributed application, the approach outlined in FIG. 7a may have relatively low performance overhead. If responses from the worker nodes to which load balancer 720 assigns work requests are the only sources of workload metrics, however, the accuracy and timeliness of the metrics may depend heavily on how often the load balancer assigns work requests to different worker nodes, and also on the time it takes for the responses to be generated.

Figure 7B:
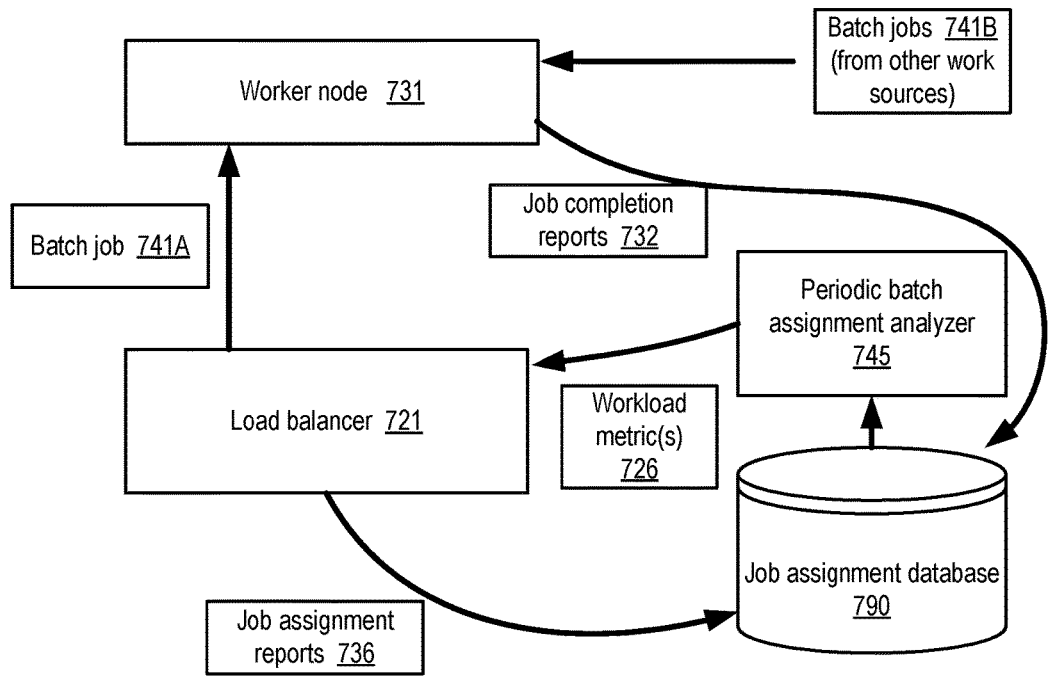

In FIG. 7b, the load balancer 721 may be responsible for assigning batch jobs such as 741A to worker nodes such as 731. The batch jobs may take longer than web-services work requests, and in many cases a response may not necessarily be provided to the load balancer when a given batch job completes. The load balancer may save job assignment reports 736 to a job assignment database 790 in the depicted embodiment. A given worker node 731 may receive batch jobs 741B from a number of other sources in addition to load balancer 721. The worker node 731 may transmit job completion reports to the batch assignment database 790. A batch assignment analyzer 745 (e.g., a process of thread of execution) may periodically analyze the batch assignment database 790, determine the number of outstanding batch jobs assigned to each worker node, and provide those workload metric(s) 726 to the load balancer 721. In some embodiments, a load balancer may query a batch assignment analyzer 745 to obtain the current workload metrics—that is, the workload metrics 726 may either be pushed to the load balancer 731, or pulled by the load balancer 731 from the database 790. In one embodiments, both push and pull modes of transferring the workload metrics may be supported.

Figure 8A:
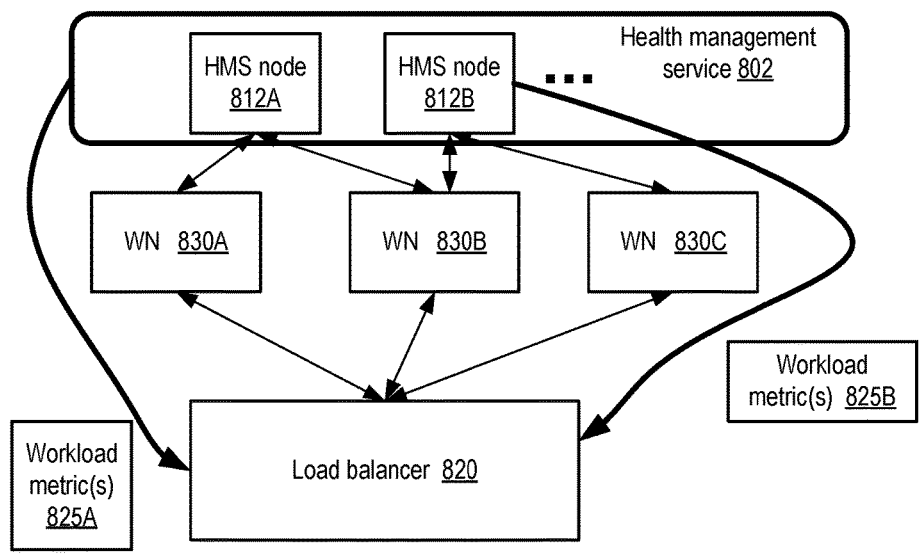

In some embodiments, a health monitoring service or a performance monitoring service may be configured for the distributed application, e.g., to detect failures or unexpected operating conditions and take the appropriate remedial actions (such as failing over the responsibilities of a given problematic worker node to a replacement worker node) and/or to enable automated scaling of the distributed application. A distributed health management service 802 comprising a plurality of health management nodes 812 (e.g., HMS nodes 812A and 812B) is shown in FIG. 8a. A given HMS node may collect workload metrics (including for example some of the types of metrics illustrated in FIG. 5) from a set of one or more worker nodes, and provide the collected metrics to destinations such as a load balancer 820 and/or an auto-scaling manager. In some embodiments a given load balancer 820 may collect respective sets of workload metrics 825 (e.g., 825A or 825B) from a plurality of HMS nodes. The metrics may be obtained using a pull model (in which the load balancer requests metrics from the health management service nodes), a push model (in which the health management service nodes transmit collected metrics to load balancers according to a schedule or based on triggering conditions), or a hybrid push-pull model in different embodiments.

Figure 8B:
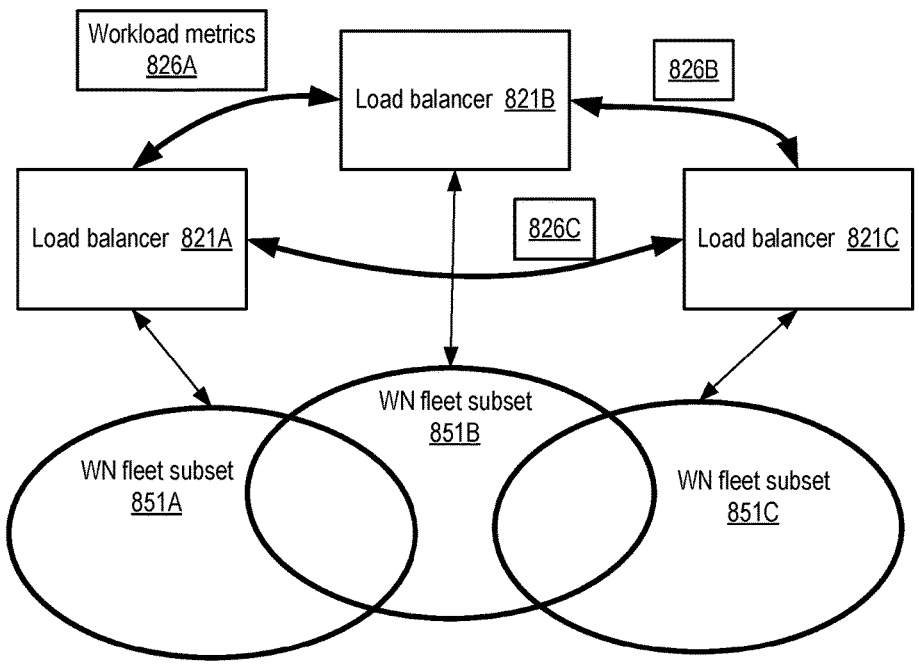

In one embodiment, the fleet of worker nodes of the distributed application may be partitioned, with respective load balancers configured for each partition. In FIG. 8b, for example, the application's worker nodes are divided into three groups: WN fleet subset 851A (for which load balancer 821A is configured), WN fleet subset 851B (for which load balancer 821B is configured), and WN fleet subset 851C (for which load balancer 821C is configured). As shown, the fleet subsets may overlap with one another in the depicted embodiment—e.g., some worker nodes are members of both subsets 851A and 851B, and other worker nodes are members of both subsets 851B and 851C. In at least one embodiment, the membership of the WN fleet subsets may change dynamically—for example, a worker node to which work requests were being assigned by load balancer 821A alone may be added to load balancer 821B's fleet subset 851B as and when needed. In the scenario depicted in FIG. 8b, workload information regarding the worker nodes may be exchanged, e.g., periodically or on demand, among the different load balancers 821. For example, metrics 826A may be transmitted between load balancers 821A and 821B, metrics 826B may be transmitted between load balancers 821B and 821C, and metrics 826C may be transmitted between load balancers 821A and 821C. Other sources of workload metrics, not shown in FIG. 7a, 7b, 8a or 8b, may be employed in some embodiments.

Methods for Load Balancing Using Incomplete Workload Information

Figure 9:
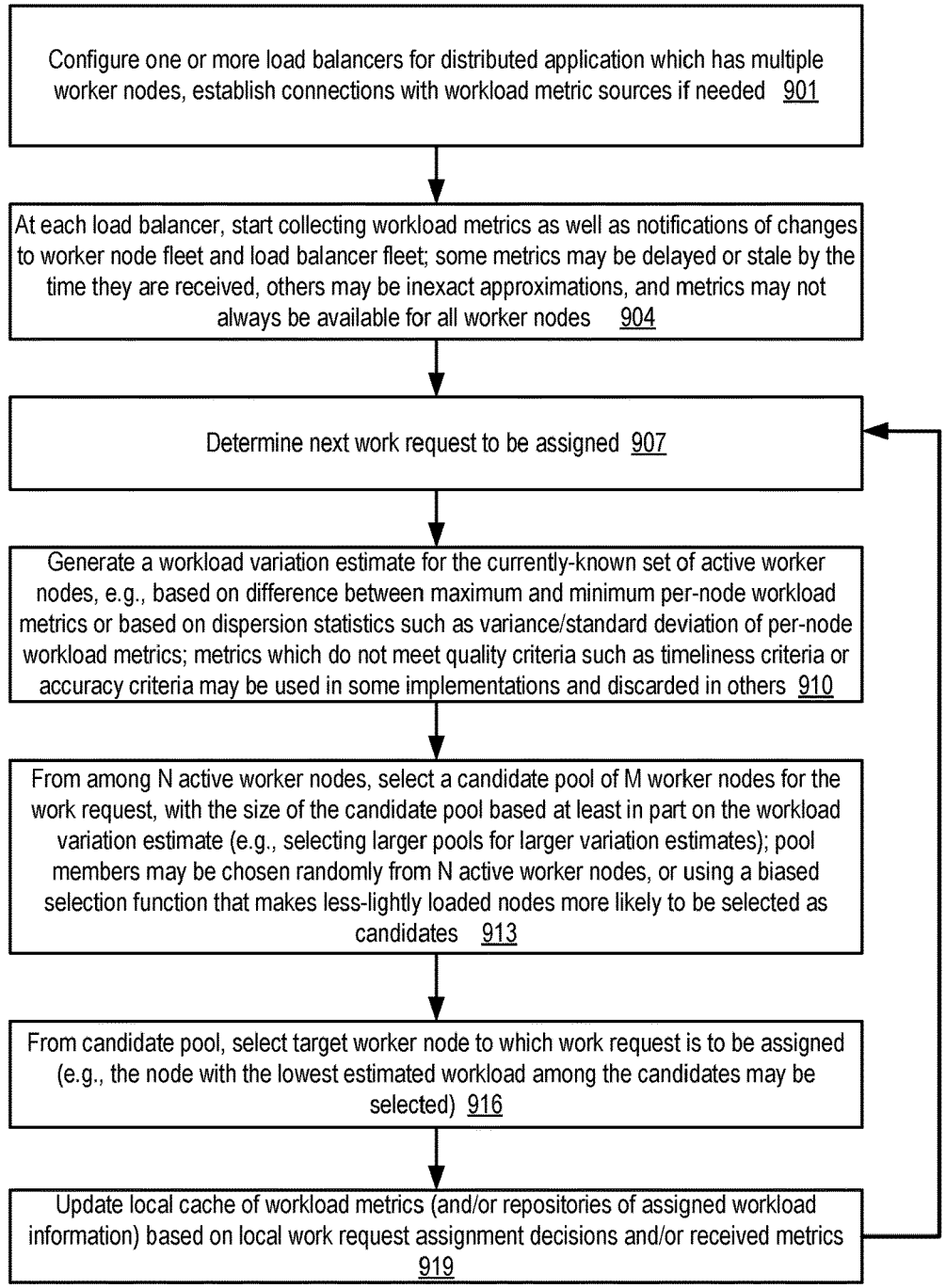
FIG. 9 illustrates aspects of operations that may be performed to balance workloads across multiple worker nodes of a distributed system in environments in which workload information available at a given load balancer may be incomplete, according to at least some embodiments.

FIG. 9 illustrates aspects of operations that may be performed to balance workloads across multiple worker nodes of a distributed system in environments in which workload information available at a given load balancer may be incomplete, according to at least some embodiments. As shown in element 901, an initial set of one or more load balancers may be configured for a distributed application which has numerous worker nodes. In some embodiments, as part of the initialization procedure of the load balancer, parameters such as target timeliness criteria (e.g., the delay that results in classifying a metric as "stale" versus "up-to-date") and/or accuracy criteria for collected network metrics, the functions or techniques to be used to combine multiple workload metrics, the normalization factors associated with different types of worker nodes, etc., may be read in. For example, when computing workload variation estimates, in one embodiment the workload of a given worker node may be discarded if it fails to meet a timeliness criterion indicating that the metric should have been captured no more than T1 seconds before it is used for the workload variation estimate calculation. In other embodiments, the parameters read in by the load balancers may indicate that the most recent per-worker-node workload estimates should be used for workload variation estimates regardless of how long ago they were collected. Network connections may be established between the load balancers and various sources of workload metrics pertaining to the worker nodes, such as the worker nodes themselves, work assignment database analyzers, health monitoring service nodes, or other load balancers. Some metrics sources may differ from others with respect to the quality and accuracy of the provided metrics. In some embodiments, a given load balancer may be configured to receive and assign work requests for more than one distributed application.

At each load balancer, the collection of workload metrics associated with the worker nodes may be begun (element 904) (with the intervals between the collection of successive sets of metrics dependent on the particular metrics source and/or based on metrics request scheduling by the load balancer). The metrics available at a given point in time at a given load balancer may be imperfect in several ways: some metrics may be stale or out-of-date by the time they are received (e.g., according to the timeliness criterion of the load balancing algorithm), others may provide only imperfect indications of the actual workload, and metrics for some worker nodes may not necessarily be available. Any combination of a wide variety of metrics may be collected (and in some cases combined into composite metrics) for a given worker node in some embodiments, such as, for example, the number of outstanding work requests, the lengths of various resource queues, resource utilization levels for CPUs, memory, storage device or network devices, response times or latencies for recent work requests, etc. In addition to workload metrics, at least some of the load balancers may also subscribe to notifications of changes to the population of the worker nodes (e.g., a notification may be received at a load balancer when a new worker node is added or removed from the application's fleet), or to changes in the population of load balancers assigned to the distributed application.

When a particular load balancer determines that a work request for the distributed application is to be assigned to some worker node (element 907), it may generate a workload variation estimate for the set of currently-known active worker nodes (element 910). In some embodiments the load balancer may receive the work requests, while in other embodiments the load balancer may make load balancing decisions without receiving or transmitting the work request per se—instead, for example, work requests may be placed in a queue, and the load balancer may be notified when a work request has been added to the queue. Any of several types of workload variation estimates may be generated in various embodiments, such as an estimate based on the difference between the maximum and minimum workload levels among the known worker nodes, or an estimate based on a dispersion metric such as standard deviation or variance of the individual workload levels of the worker nodes. In some implementations, the estimate may be derived using some combination of stale metrics and up-to-date metrics, while in other implementations stale metrics (as defined by timeliness criteria of the load balancing algorithm) may be discarded. The workload variation estimate may then be used to determine the size M of the candidate pool of worker nodes for the work request (element 913). Any desired linear or non-linear function of the workload variation estimate may be used to determine the pool size. From among N available active worker nodes, the M members of the candidate pool may be selected, e.g., either using random selection algorithm or using a biased selection algorithm in which worker nodes with lower workload estimates are in general more likely to be selected as pool members. In some embodiments in which biased selection is used, an element of randomness may be introduced in the selection process, so that for example the particular worker node which has the lowest-known current workload level is not always selected as a candidate.

From the candidate pool of M worker nodes, a particular worker node may then be selected for the work request (element 916). For example, the candidate pool member with the lowest workload level may be selected in some embodiments, while random selection (or workload-biased selection with randomness) may be used in other embodiments. The work request may be transmitted to the selected candidate node. In some embodiments, the load balancer may update its cache of workload metrics based on the assignment (e.g., by incrementing a count of outstanding work requests for the worker node to which the request is assigned), and/or repositories of assigned workloads (e.g., repositories similar to the batch job assignment database discussed earlier). Operations corresponding to elements 907 onwards may be repeated for the next work request received.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of making load balancing decisions based on imperfect workload variation information, may be useful in a variety of environments. Large dynamically-changing fleets of back-end worker nodes may be used for many applications, especially in provider networks at which automated scaling of application resources is supported. Numerous load balancers may be deployed for such applications, and it may be difficult to ensure that the information used for the load balancing decisions remains accurate and up-to-date across all the load balancers. As long as the workload information available at the load balancers is generally reasonably close to the true workload levels at the worker nodes, the described technique of dynamically estimating the variation among the currently-known workloads of worker nodes, and using the estimate to determine the size of the pool of candidate worker nodes from which one is assigned for a given work request, is likely to help smooth out application workloads more effectively than more static techniques.

Illustrative Computer System

Figure 10:
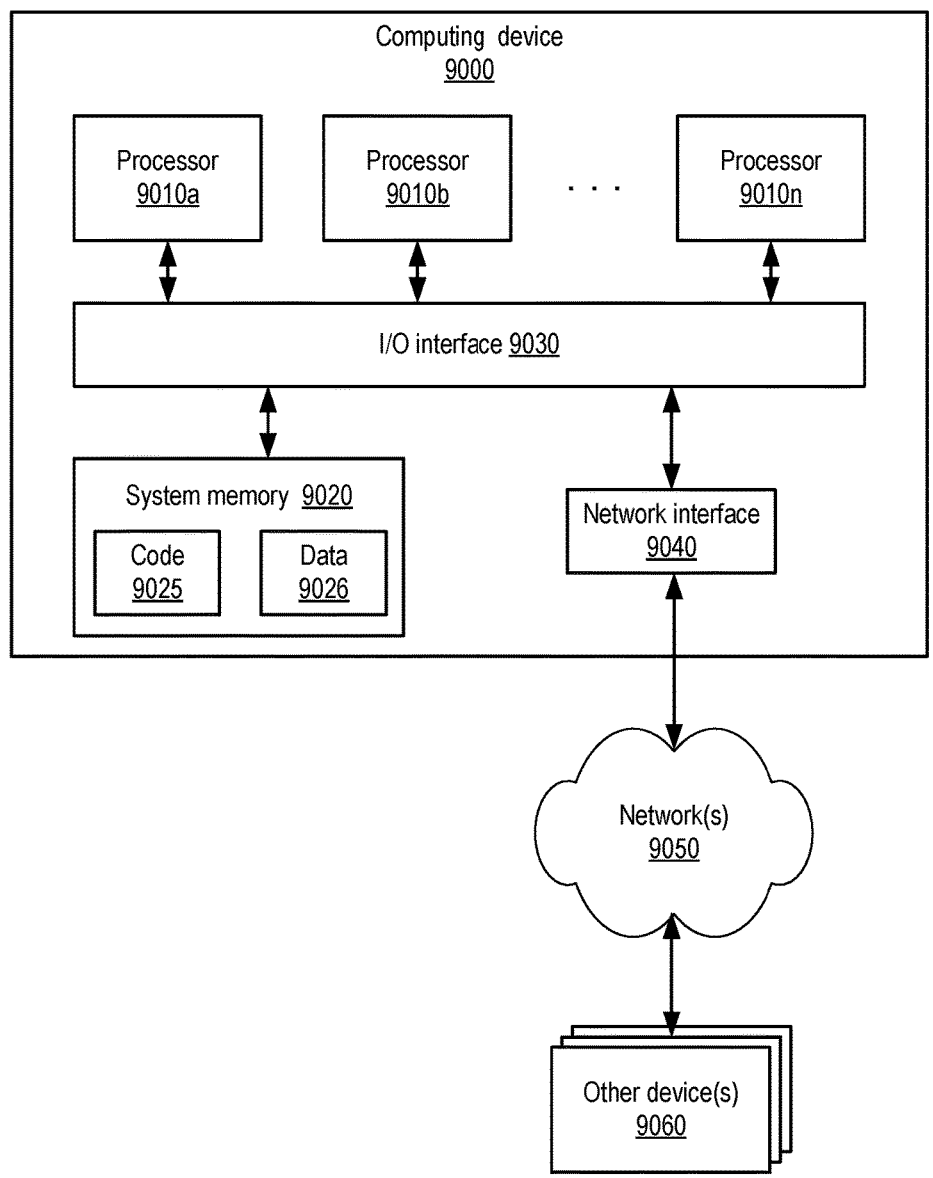
FIG. 10 is a block diagram illustrating an example computing device that may be used in at least some embodiments.

In at least some embodiments, a server that implements one or more of the techniques described above for load balancing (e.g., including the algorithms implemented at load balancer nodes, auto-scaling managers, worker nodes and the like) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
one or more processors and memory that stores program instructions that when executed by the one or more processors implement a load balancer configured to:
in response to receiving a particular work request,
select a first candidate pool of worker nodes from a plurality of worker nodes of a distributed application, wherein the number of worker nodes included in the first candidate pool is based at least in part on a first workload variation estimate, wherein the first workload variation estimate is generated based on an analysis of respective workload metrics corresponding to at least a subset of worker nodes of the distributed application, wherein at least one workload metric of the respective workload metrics fails to meet a timeliness criterion; and assign the particular work request to a first worker node of the first candidate pool; and in response to receiving another work request,
select a second candidate pool of worker nodes from the plurality of worker nodes, wherein the number of worker nodes included in the second candidate pool is (a) based at least in part on an updated workload variation estimate, wherein the updated workload variation estimate is smaller than the first workload variation estimate, and (b) smaller than the number of worker nodes included in the first target pool; and assign the other work request to a second worker node of the second candidate pool.

2. The system as recited in claim 1, wherein to select the first candidate pool of worker nodes from the plurality of worker nodes, the load balancer utilizes a random selection algorithm.

3. The system as recited in claim 1, wherein the load balancer is configured to:
select, from among member nodes of the first candidate pool, the first worker node for the particular work request based at least in part on determining that the first worker node has the lowest workload among the member nodes of the first candidate pool.

4. The system as recited in claim 1, further comprising an auto-scaling manager associated with the distributed application, wherein, prior to the receiving of the particular work request by the load balancer, the auto-scaling manager is configured to:
in response to a determination that a workload of the distributed application has reached a threshold, add a particular worker node to the plurality of worker nodes of the distributed application, wherein the particular work request is assigned to the particular worker node.

5. The system as recited in claim 1, wherein the load balancer is configured to:
normalize, based at least in part on a performance capacity of a particular worker node of the plurality of worker nodes, a first workload metric corresponding to the particular worker node; and
determine the first workload variation estimate using the normalized first workload metric.

6. A method, comprising:
performing, by a particular load balancer of a distributed system, wherein the particular load balancer is executed by one or more computing devices:
determining respective workload metrics corresponding to a plurality of worker nodes of the distributed system;
in response to receiving a particular work request,
updating, based at least in part on a first set of workload metrics, a first workload variation estimate associated with the plurality of worker nodes;
selecting a first candidate pool of worker nodes from the plurality of worker nodes, wherein the number of worker nodes included in the first candidate pool is based at least in part on the first workload variation estimate; and
assigning the particular work request to a particular worker node selected from the first candidate pool of worker nodes.

7. The method as recited in claim 6, wherein the first workload variation estimate is based at least in part on a difference between (a) a highest workload indicated for a worker node in the first set of workload metrics, and (b) a lowest workload indicated for a worker node in the first set of workload metrics.

8. The method as recited in claim 6, wherein the first workload variation estimate is based at least in part on one of: (a) a standard deviation of workloads indicated for individual ones of the worker nodes in the first set of workload metrics or (b) a variance of workloads indicated for individual ones of the worker nodes in the first set of workload metrics.

9. The method as recited in claim 6, wherein the respective workload metrics are obtained from one or more metrics sources including one or more of: (a) the particular worker node, (b) a database indicating respective batch job assignments of individual ones of the plurality of worker nodes, (c) a node health monitoring agent, or (d) another load balancer of the distributed system.

10. The method as recited in claim 6, further comprising performing, by the particular load balancer:
examining a first timestamp associated with a first workload metric of a first worker node of the plurality of worker nodes;
examining a second timestamp associated with a second workload metric of a second worker node of the plurality of worker nodes; and
determining, based at least in part on an analysis of the first timestamp and the second timestamp, that the first workload metric is to be used to update the first workload variation estimate, and that the second workload metric is not to be used to update the first workload variation estimate.

11. The method as recited in claim 6, wherein selecting the first candidate pool of worker nodes from the plurality of worker nodes comprises utilizing a random selection algorithm.

12. The method as recited in claim 6, further comprising performing, by the particular load balancer:
selecting, from among member nodes of the first candidate pool, the particular worker node for the particular work request based at least in part on determining that the particular worker node has the lowest workload among the member nodes of the first candidate pool.

13. The method as recited in claim 6, wherein said determining respective workload metrics corresponding to the plurality of worker nodes comprises:
determining one or more of (a) a number of outstanding work requests at a first worker node of the plurality of nodes, (b) a measure of work request response time associated with the first worker node, or (c) a resource utilization level of the first worker node.

14. The method as recited in claim 6, further comprising performing, by the particular load balancer:
generating a multi-attribute workload metric associated with the particular worker node, based on a combination of a plurality of workload metrics of the particular worker node, wherein the plurality of workload metrics includes one or more of (a) a number of outstanding work requests at the particular worker node, (b) a measure of work request response time associated with the particular worker node, or (c) a resource utilization level of the particular worker node; and
determining that the particular work request is to be assigned to the particular worker node based at least in part on the multi-attribute workload metric.

15. The method as recited in claim 6, wherein the particular work request comprises one or more of: (a) a web services request directed to a network-accessible service of a provider network, (b) a database query, or (c) a network routing request.

16. The method as recited in claim 6, further comprising performing, by the particular load balancer:
   selecting, for a particular category of a plurality of categories of work requests of the distributed system, a second candidate pool of worker nodes from the plurality of worker nodes, wherein the number of worker nodes included in the second candidate pool is based at least in part on an updated workload variation estimate; and
   assigning one or more work requests of the particular category to a worker node selected from the second candidate pool of worker nodes.

17. A non-transitory computer-accessible storage medium storing program instructions that when executed on one or more processors implements a particular load balancer of a distributed system, wherein the load balancer is configured to:
   obtain respective workload metrics corresponding to a plurality of worker nodes of the distributed system from one or more metric sources;
   in response to determining that a particular work request is to be assigned,
      generate, based at least in part on a first set of workload metrics, a first workload variation estimate associated with the plurality of worker nodes;
      identify a first candidate pool of worker nodes from the plurality of worker nodes, wherein the number of worker nodes included in the first candidate pool is based at least in part on the first workload variation estimate; and
      transmit the particular work request to a particular worker node of the first candidate pool of worker nodes.

18. The non-transitory computer-accessible storage medium as recited in claim 17, wherein the one or more metrics sources include one or more of: (a) the particular worker node, (b) a database indicating respective batch job assignments of individual ones of the plurality of worker nodes, (c) a component of a health monitoring service associated with the distributed system, or (d) another load balancer of the distributed system.

19. The non-transitory computer-accessible storage medium as recited in claim 17, wherein to identify the first candidate pool of worker nodes from the plurality of worker nodes, the particular load balancer utilizes a random selection algorithm.

20. The non-transitory computer-accessible storage medium as recited in claim 17, wherein the particular load balancer is configured to:
   select, from among member nodes of the first candidate pool, the particular worker node for the particular work request based at least in part on determining that the particular worker node has the lowest workload among the member nodes of the first candidate pool.

21. The non-transitory computer-accessible storage medium as recited in claim 17, wherein the particular load balancer is configured to:
   assign a particular weight to a particular worker node of the plurality of worker nodes, wherein the particular weight is based at least in part on a workload metric of the particular worker node; and
   select the particular worker node for inclusion in the first candidate pool based at least in part on the particular weight.

* * * * *